May 25, 1965 J. HEINE 3,185,268
STRUCTURE FOR FASTENING ARTICLES TO THIN WALLS
AND METHOD FOR MANUFACTURING SUCH STRUCTURE
Filed Feb. 14, 1963

INVENTOR
Joseph Heine

BY
Michael S Striker
ATTORNEY

United States Patent Office

3,185,268
Patented May 25, 1965

3,185,268
STRUCTURE FOR FASTENING ARTICLES TO THIN WALLS AND METHOD FOR MANUFACTURING SUCH STRUCTURE
Joseph Heine, Leonberg, Germany, assignor to Robert Bosch G.m.b.H., Stuttgart, Germany
Filed Feb. 14, 1963, Ser. No. 258,504
Claims priority, application Germany, Feb. 23, 1962, B 66,065
5 Claims. (Cl. 189—36)

The present invention relates to fastener assemblies.

More particularly, the present invention deals with the problem of securely fastening articles to relatively thin walls, particularly where the walls are made of a relatively soft material.

For example, where an article is made of an aluminum or zinc die casting which has a relatively thin wall which may, for example, have a thickness on the order of 2 or 3 mm., due to the extremely small thickness of the wall and also the relatively soft material thereof if the wall is formed with a threaded bore there simply is not sufficient thread available for the purpose of providing a secure connection between an article located against one face of the wall, and the wall itself by way of a bolt whose threads could cooperate with a threaded bore formed in such a thin wall. Of course, under certain circumstances the fixing of an article to such a wall is simply carried out by forming an opening in the wall, passing a bolt through the opening and providing a nut which is connected to the bolt at one face of the wall; but this latter solution is not always satisfactory because lock nuts are required to prevent turning of the fastening elements and because there is not always sufficient space available to accommodate such fastening elements. Where the fastening elements simply extend through an opening of such a wall then of course the fastening elements themselves occupy space at opposite sides of the wall, and under certain conditions such space is very valuable and simply is not available.

For example, in the case of housings of distributors which are used in internal combustion engines this problem is frequently encountered. Such distributor housings are made of a relatively soft material, the housings being in the form of aluminum or zinc die castings, for example, and the wall of such a housing has an extremely small thickness of the type referred to above. The interior of such a distributor housing is of course occupied by the distributor components and there simply is not available in such a housing a space which is sufficient to accommodate not only the shank of a bolt but also a nut and a lock nut as would be required in the case where the fastener structure extended through a simple opening formed in the wall.

It is accordingly a primary object of the present invention to solve the above problem with a structure which on the one hand occupies very little space and which on the other hand is capable of providing an absolutely secure connection of an article to one face of a thin wall of the type referred to above.

It is a further object of the present invention to provide an exceedingly simple and inexpensive method for manufacturing a fastener assembly of this type.

Yet another object of the present invention is to provide a structure and method which are capable of taking advantage of the structure of existing conventional fastener elements so that it is unnecessary with the invention to provide any special structures which must be manufactured for the invention. Thus it becomes possible to use with the invention materials which are readily available.

It is also an object of the present invention to provide a process and structure of the above type which not only are extremely simple and inexpensive as well as reliable but which in addition can be used and manufactured in an exceedingly simple way requiring no special instructions or training so that the manner in which the structure of the invention is to be employed is immediately apparent to a person skilled in the art.

With these objects in view the invention includes, in a fastener assembly, a relatively thin wall having one face to which an article is to be fastened and having another face which is opposed to said one face, said wall having an aperture passing therethrough, said aperture being composed of a first aperture portion located adjacent said one face of said wall and having a polygonal cross section, and a second aperture portion adjacent said other face of said wall having a substantially circular cross section having a diameter substantially equal to the smallest diameter of said first aperture portion, and spaced radially inwardly extending wall portions leaving within said aperture a free space having a predetermined diameter, and a polygonal nut having the same polygonal configuration as said first aperture portion and having a screw-threaded opening having a diameter smaller than said predetermined diameter of the free space within the second aperture portion, the polygonal nut being seated within the first aperture portion of the aperture tightly fitting therein and supported by the radially inwardly extending wall portions of the second aperture portion, whereby the inwardly extending wall portions of the second aperture portion firmly support the nut in the first aperture portion without occluding the screw-threaded opening therein.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings, in which:

Figure 1:
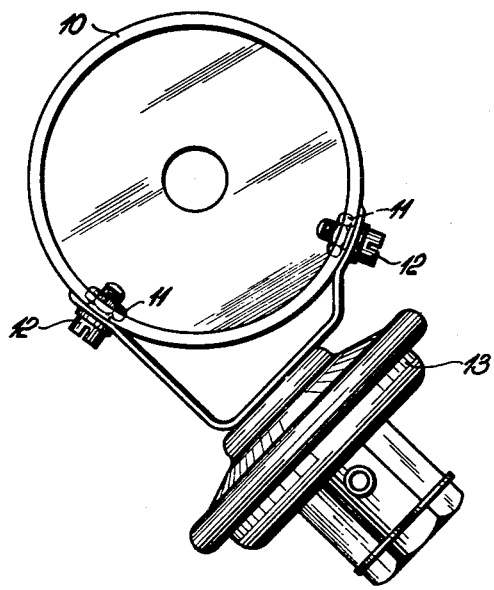
FIG. 1 is a diagrammatic top plan view of an assembly which is provided with the structure of the invention.

Referring to the drawings, there is illustrated therein a relatively thin wall 10 which in the illustrated example is a cylindrical wall of a distributor housing. This wall is in the form of an aluminum die casting and has a wall thickness of 2 mm. It is necessary to fix to such a wall an article such as the diaphragm assembly 13 shown in FIG. 1, and difficulties of the type referred to above are encountered in fixing such articles to the wall 10 at the exterior thereof since there is very little space available in the interior of the distributor housing for fastener elements.

Figure 2:
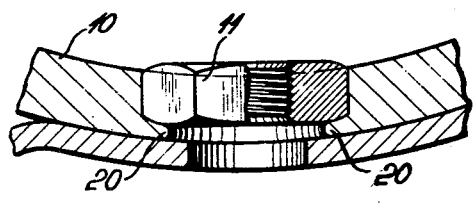
FIG. 2 is a sectional view on an enlarged scale of the fastener structure used in FIG. 1.
Figure 3:
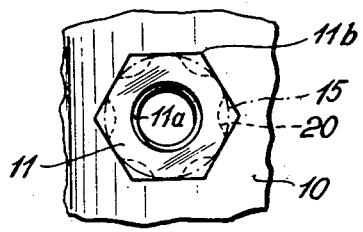
FIG. 3 illustrates the structure of FIG. 2 as seen from the upper side of FIG. 2.

In accordance with the present invention one element of the fastening assembly is the nut 11 which has a conventional hexagonal periphery provided with the corners 11b (FIG. 3), and this nut is made of steel and is of course much harder than the material of the wall 10, although, as is shown in FIG. 2, the nut 11 is thinner than the wall 10. In accordance with the invention the wall 10 is formed initially with an opening 15, shown with the dot-dash line in FIG. 3, and it will be noted that the opening 15 is circular and has the size of a circle which is capable of being circumscribed within a polygon whose size and configuration conforms to the configuration of the outer periphery of the fastener member 11. The fastener member 11 has a central fastening portion 11a which is substantially aligned with the center of the opening 15.

In accordance with the present invention when an article is to be fixed to the exterior face of the wall 10, the nut 11 is simply pressed into the interior face of the wall 10 while maintaining the fastening portion 11a of the fastener member 11 in substantial alignment with the center of the opening 15. Because the material of the fastener member 11 is harder than that of the wall 10, the corner portions 11b form indentations at the inner face of the wall 10 which of course conform to the configurations of the corners 11b and in which the corners 11b become seated. During the formation of these indentations, the corners of the fastener member displace some of the material of the wall 10 so as to form wall portions 20 which separate the fastener member 11 from the outer face of the wall 10 and which are substantially uniformly distributed along the edge of the opening 15 and about the center thereof, as is apparent from FIG. 3. Thus, with the process and structure of the invention the corners of the periphery of the polygonal fastener member 11 become seated in the indentations in such a way that the fastener member 11 cannot turn with respect to the wall 10 while at the same time being separated from its outer face by the wall portions 20 and also while rendering the central fastening portion 11a accessible through the opening in the wall 10, and of course part of the space required for the fastener member 11 is supplied by the material of the wall 10 itself inasmuch as the corners of the fastener member become seated in the indentations formed by pressing the fastener member into the wall 10. In the example illustrated in FIG. 1 the wall 10 is formed with a pair of the openings 15 and a pair of the nuts 11 are pressed into the inner face of the wall 10 so that a strap which is fixed to the diaphragm assembly can have its bores aligned with the openings 15 and suitable bolts can then be passed through the openings of the straps with their threaded shanks cooperating with the threaded bores 11a of the nuts 11 so that in this simple way it is possible to fix an article to the wall 10 in a prefectly secure manner in spite of the small thickness of the wall 10 and the soft material of which it is made, and in addition it will be noted from FIG. 1 that very little space within the interior of the housing of the distributor is occupied by fastening structure. The wall portions 20 separate the fastener members 11 from the exterior surface of the wall 10 and prevent axial shifting of the fastener members 11 with the wall portions 20 becoming compressed during the fixing of the bolts 12 to the nuts 11 while fastening the article 13 to the exterior surface of the wall 10. The nuts 11 are conventional nuts which are readily available on the open market and do not need to have any special construction.

The diaphragm assembly 13 responds in a manner well known in the art to changes in the vacuum in the intake manifold of the engine for automatically adjusting the distributor so as to adjust the timing of the firing in the cylinders of the engine.

It will be understood that each of the elements described above, or two or more together, may also find a useful application in other types of fasteners differing from the types described above.

While the invention has been illustrated and described as embodied in fasteners for attaching articles to thin walls, it is not intended to be limited to the details shown, since various modifications and structural changes may be made without departing in any way from the spirit of the present invention.

Without further analysis, the foregoing will so fully reveal the gist of the present invention that others can by applying current knowledge readily adapt it for various applications without omitting features that, from the standpoint of prior art, fairly constitute essential characteristics of the generic or specific aspects of this invention and, therefore, such adaptations should and are intended to be comprehended within the meaning and range of equivalence of the following claims.

What is claimed as new and desired to be secured by Letters Patent is:

1. A fastener assembly comprising, in combination, a relatively thin wall having one face to which an article is to be fastened and having another face which is opposed to said one face, said wall having an aperture passing therethrough, said aperture being composed of a first aperture portion located adjacent said one face of said wall and having a polygonal cross section and a second aperture portion adjacent said other face of said wall having a substantially circular cross section having a diameter substantially equal to the smallest diameter of said first aperture portion and spaced radially inwardly extending wall portions leaving within said aperture a free space having a predetermined diameter; and a polygonal nut having the same polygonal configuration as said first aperture portion and having a screw-threaded opening having a diameter smaller than said predetermined diameter of said free space within said second aperture portion, said polygonal nut seated within said first aperture portion of said aperture tightly fitting therein and supported by said radially inwardly extending wall portions of said second aperture portion, whereby said inwardly extending wall portions of said second aperture portion firmly support said nut in said first aperture portion without occluding said screw-threaded opening therein.

2. A fastening assembly for attaching an article comprising, in combination, a relatively thin wall having one face to which an article is to be fastened and having another face which is opposed to said one face, said wall having an aperture passing therethrough, said aperture being composed of a first aperture portion located adjacent said one face of said wall and having a polygonal cross section and a second aperture portion adjacent said other face of said wall having a substantially circular cross section having a diameter substantially equal to the smallest diameter of said first aperture portion and spaced radially inwardly extending wall portions leaving within said aperture a free space having a predetermined diameter, said spaced radially inwardly extending wall portions being located only within said second aperture portion without projecting outwardly beyond said one face of said relatively thin wall; a polygonal nut having the same polygonal configuration as said first aperture portion and having a screw-threaded opening having a diameter smaller than said predetermined diameter of said free space within said second aperture portion, said polygonal nut seated within said first aperture portion of said aperture tightly fitting therein and supported by said radially inwardly extending wall portions of said second aperture portion, whereby said inwardly extending wall portions of said second aperture portion firmly support said nut in said first aperture portion without occluding said screw-threaded opening therein; an article portion having a hole passing therethrough and superimposed upon said one face of said relatively thin wall with said hole arranged substantially coaxially with said aperture passing through said wall; and a screw having a screw head and screw-threaded into said nut in said first aperture portion with said screw head located outwardly of said article portion and firmly holding said article portion attached to said relatively thin wall.

3. A process for manufacturing a fastener assembly which includes a relatively thin wall having one face and another face and to said one face of which an article is to be fastened, comprising the steps of forming in said wall a substantially circular opening and pressing a polygonal nut having a thickness which is smaller than the thickness of said relatively thin wall and having a minimum outer diameter which is substantially equal to the diameter of said circular opening into said opening from the other face of said relatively thin wall with said nut arranged substantially coaxially with said opening, and to a depth which is smaller than the thickness of said relatively thin wall so that in that portion adjacent to the other face of said wall which is not penetrated by said nut inwardly projecting wall portions will be formed by those portions of the nut which extend beyond the diameter of said opening, said inwardly projecting wall portions being adapted to support said nut within said opening and prevent its passing through said opening when an article is fastened to said one face of said thin wall by a screw passing through said opening and engaging said nut embedded in said thin wall.

4. A process for manufacturing a fastener assembly which includes a relatively thin wall having one face and another face and to said one face of which an article is to be fastened, comprising the steps of forming in said wall a substantially circular opening and pressing a polygonal nut having a thickness which is smaller than the thickness of said relatively thin wall and having a minimum outer diameter which is substantially equal to the diameter of said circular opening into said opening from the other face of said relatively thin wall with said nut arranged substantially coaxially with said opening, and to a depth which is smaller than the thickness of said relatively thin wall so that in that portion adjacent to the other face of said wall which is not penetrated by said nut radially inwardly projecting wall portions will be formed substantially in the plane of said one face by those portions of the nut which extend beyond the diameter of said opening, said radially inwardly projecting wall portions being adapted to support said nut within said opening and prevent its passing through said opening when an article is fastened to said one face of said thin wall by a screw passing through said opening and engaging said nut embedded in said thin wall.

5. A process for manufacturing a fastener assembly which includes a relatively thin wall having one face and another face and to said one face of which an article is to be fastened, comprising the steps of forming in said wall a substantially circular opening and pressing a polygonal nut having a thickness which is smaller than the thickness of said relatively thin wall and having a minimum outer diameter which is substantially equal to the diameter of said circular opening into said opening from the other face of said relatively thin wall with said nut arranged substantially coaxially with said opening, and to a depth which is smaller than the thickness of said relatively thin wall so that those portions of the nut which extend beyond the diameter of said opening will compact the material of the wall juxtaposed with them in the direction of movement of the nut and cause the material to flow radially inwardly of said opening whereby in that portion adjacent to the other face of said wall which is not penetrated by said nut radially inwardly projecting wall portions will be formed substantially in the plane of said one face, said radially inwardly projecting wall portions being adapted to support said nut within said opening and prevent its passing through said opening when an article is fastened to said one face of said thin wall by a screw passing through said opening and engaging said nut embedded in said thin wall.

References Cited by the Examiner
UNITED STATES PATENTS

| | | | |
|---|---|---|---|
| 1,919,552 | 7/33 | Hasselquist | 20—36 X |
| 2,499,241 | 1/50 | Courtot | 29—525 |
| 3,074,292 | 1/63 | Polmon | 264—249 |

HARRISON R. MOSELEY, *Primary Examiner*

RICHARD P. MACHADO, *Examiner*.